(12) United States Patent
Shen

(10) Patent No.: US 10,042,756 B2
(45) Date of Patent: *Aug. 7, 2018

(54) METHODS FOR SCHEDULING READ COMMANDS AND APPARATUSES USING THE SAME

(71) Applicant: Silicon Motion, Inc., Jhubei (TW)

(72) Inventor: Yang-Chih Shen, Taipei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,483

(22) Filed: May 8, 2017

(65) Prior Publication Data

US 2017/0242787 A1 Aug. 24, 2017

Related U.S. Application Data

(63) Continuation of application No. 14/738,481, filed on Jun. 12, 2015.

(30) Foreign Application Priority Data

Sep. 5, 2014 (TW) .............................. 103130718 A

(51) Int. Cl.
*G06F 12/10* (2016.01)
*G06F 12/02* (2006.01)
(Continued)

(52) U.S. Cl.
CPC ...... *G06F 12/0246* (2013.01); *G06F 12/1009* (2013.01); *G06F 12/1027* (2013.01);
(Continued)

(58) Field of Classification Search
CPC ............ G06F 12/1009; G06F 12/1027; G06F 2212/657; G06F 2212/68
See application file for complete search history.

(56) References Cited

U.S. PATENT DOCUMENTS 7,594,062 B2 9/2009 In et al.
9,170,932 B1 * 10/2015 Lo ....................... G06F 12/0246
(Continued)

FOREIGN PATENT DOCUMENTS

CN 1389790 A 1/2003
CN 1648879 A 8/2005

OTHER PUBLICATIONS

Office Action of corresponding CN application, published on Jan. 2, 2018.

*Primary Examiner* — Yong Choe
(74) *Attorney, Agent, or Firm* — Silicon Motion, Inc.

(57) ABSTRACT

A method for scheduling read commands, performed by a processing unit, contains the following steps: Logical read commands are received from a master device via a first access interface, where each logical read command requests to read data of a logical address. First physical storage locations of mapping segments associated with the logical addresses are obtained from a high-level mapping table, and a second access interface is directed to read the mapping segments from the first physical storage locations of a storage unit. Second physical storage locations associated with the logical addresses are obtained from the mapping segments, and the second access interface is directed to read data from the second physical storage locations of the storage unit. The first access interface is directed to clock the data of the logical addresses out to the master device.

20 Claims, 11 Drawing Sheets

(51) Int. Cl.
*G06F 12/1027* (2016.01)
*G06F 12/1009* (2016.01)

(52) U.S. Cl.
CPC ...... *G06F 2212/65* (2013.01); *G06F 2212/68* (2013.01); *G06F 2212/7201* (2013.01)

(56) References Cited

U.S. PATENT DOCUMENTS

| | | |
|---|---|---|
| 2003/0065899 A1 | 4/2003 | Gorobets |
| 2008/0098195 A1 | 4/2008 | Cheon |
| 2016/0011790 A1* | 1/2016 | Rostoker ............... G06F 3/0611 711/103 |

* cited by examiner

METHODS FOR SCHEDULING READ COMMANDS AND APPARATUSES USING THE SAME

CROSS REFERENCE TO RELATED APPLICATIONS

This Application is a continuation of U.S. patent application Ser. No. 14/738,481 filed on Jun. 12, 2015, which claims priority of Taiwan Patent Application No. 103130718 filed on Sep. 5, 2014, the entirety of which are incorporated by reference herein.

BACKGROUND

Technical Field

The present invention relates to flash memory, and in particular to methods for scheduling read commands and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal. Reducing manufacturing cost is always the focus, including reducing the storage space of DRAM (Dynamic Random Access Memory). Accordingly, what is needed are methods for scheduling read commands based on a hardware architecture, in which a storage mapping table is not stored in a DRAM, and apparatuses that use these methods.

BRIEF SUMMARY

An embodiment of the invention introduces a method for scheduling read commands, performed by a processing unit, including at least the following steps. Logical read commands are received from a master device via a first access interface, where each logical read command requests to read data of a logical address. First physical storage locations of mapping segments associated with the logical addresses are obtained from a high-level mapping table, and a second access interface is directed to read the mapping segments from the first physical storage locations of a storage unit. Second physical storage locations associated with the logical addresses are obtained from the mapping segments, and the second access interface is directed to read data from the second physical storage locations of the storage unit. The first access interface is directed to clock the data of the logical addresses out to the master device.

An embodiment of the invention introduces an apparatus for scheduling read commands including at least a first access interface, a second access interface and a processing unit. The processing unit, coupled to the first access interface, receives logical read commands from the master device via the first access interface, where each logical read command requests to read data of a logical address. The processing unit, coupled to the second access interface, obtains first physical storage locations of mapping segments associated with the logical addresses from a high-level mapping table and directs the second access interface to read the mapping segments from the first physical storage locations of the storage unit. The processing unit obtains second physical storage locations associated with the logical addresses from the mapping segments, directs the second access interface to read data from the second physical storage locations of the storage unit and directs the first access interface to clock the data of the logical addresses out to the master device.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
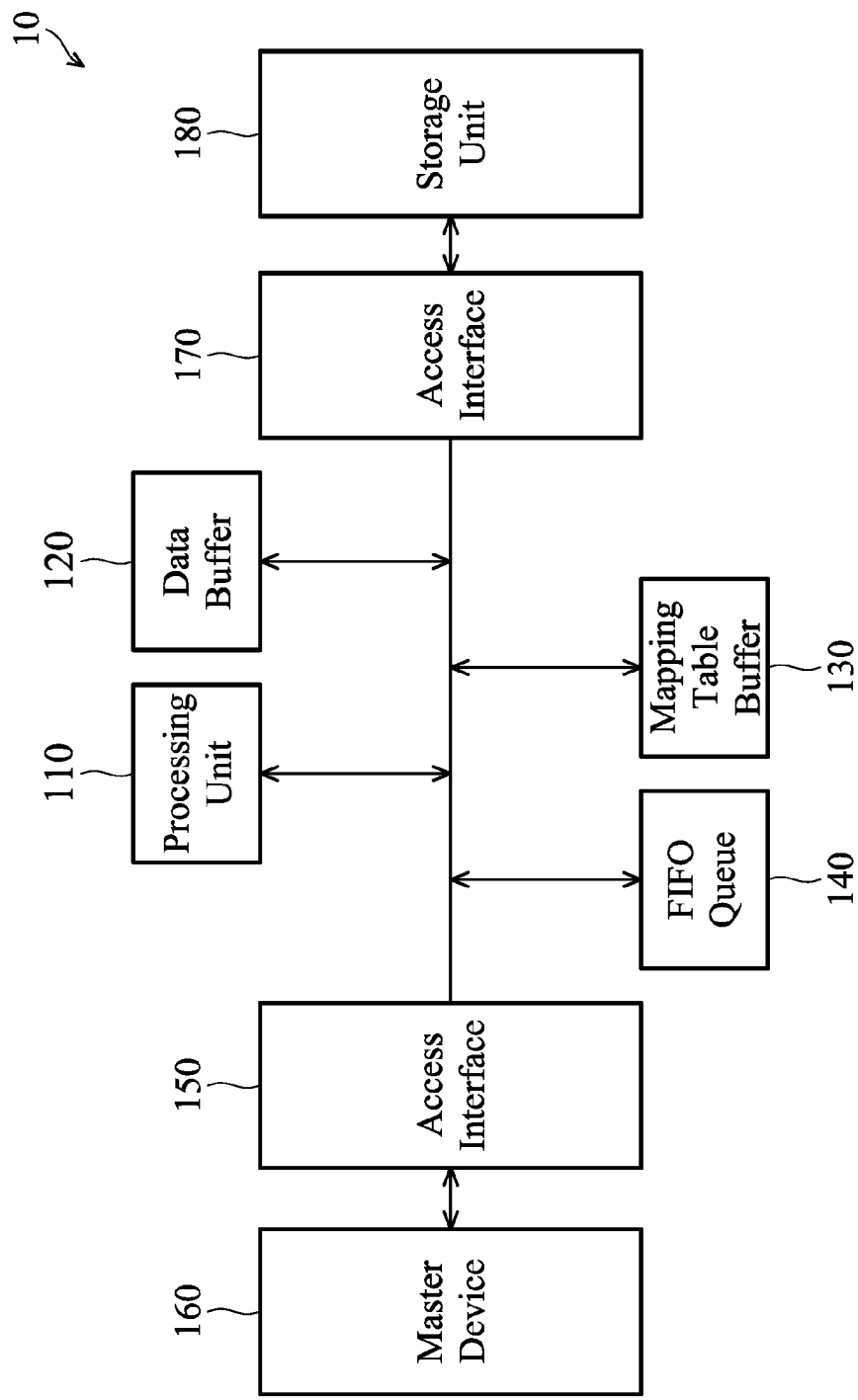
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 10 through an access interface 170 and reads data from a designated address thereof through the same interface 170. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with other electronic devices through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
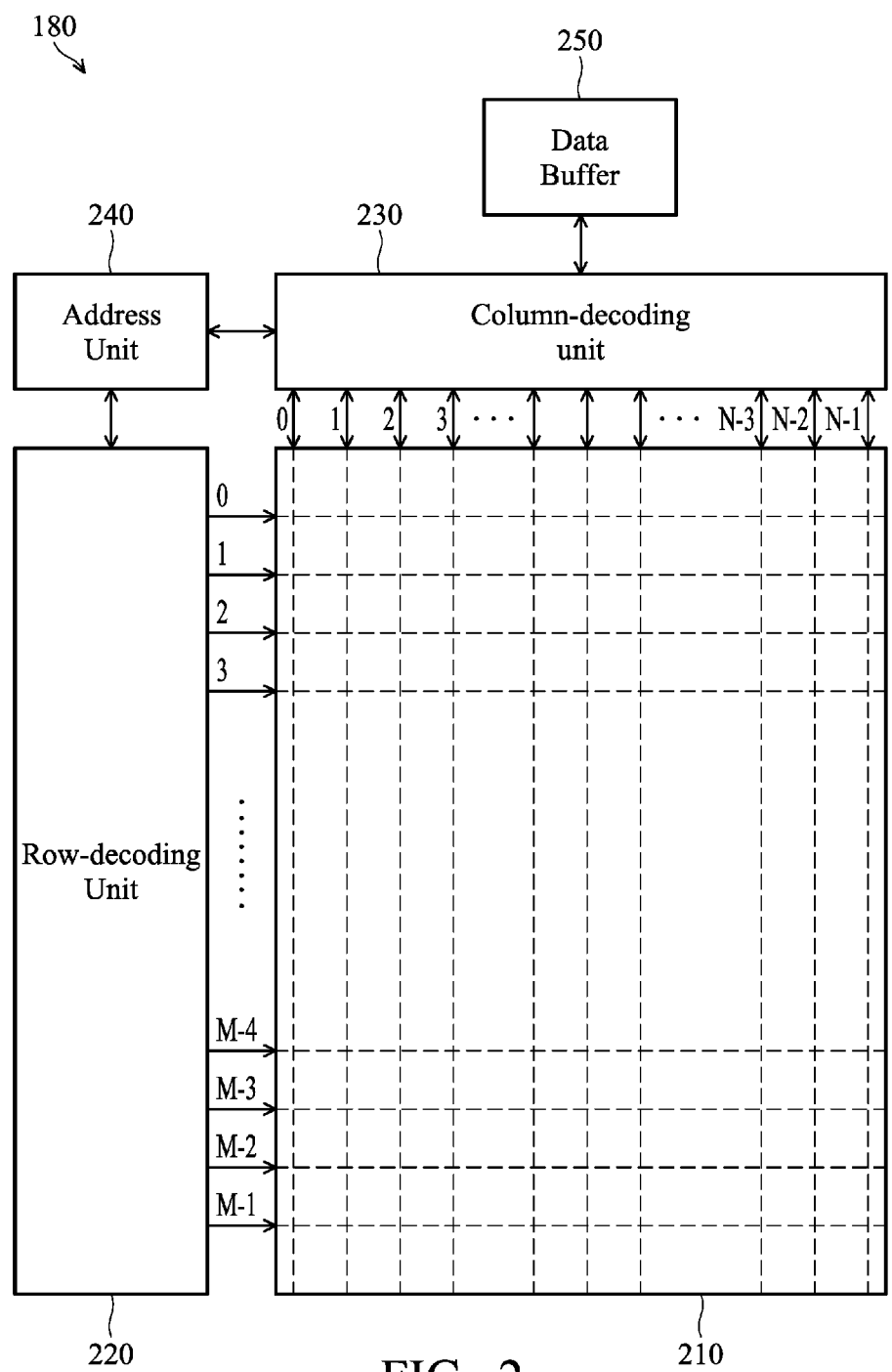
FIG. 2 shows a schematic diagram depicting a storage unit of a flash memory according to an embodiment of the invention.

FIG. 2 shows a schematic diagram depicting a storage unit of a flash memory according to an embodiment of the invention. A storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3:
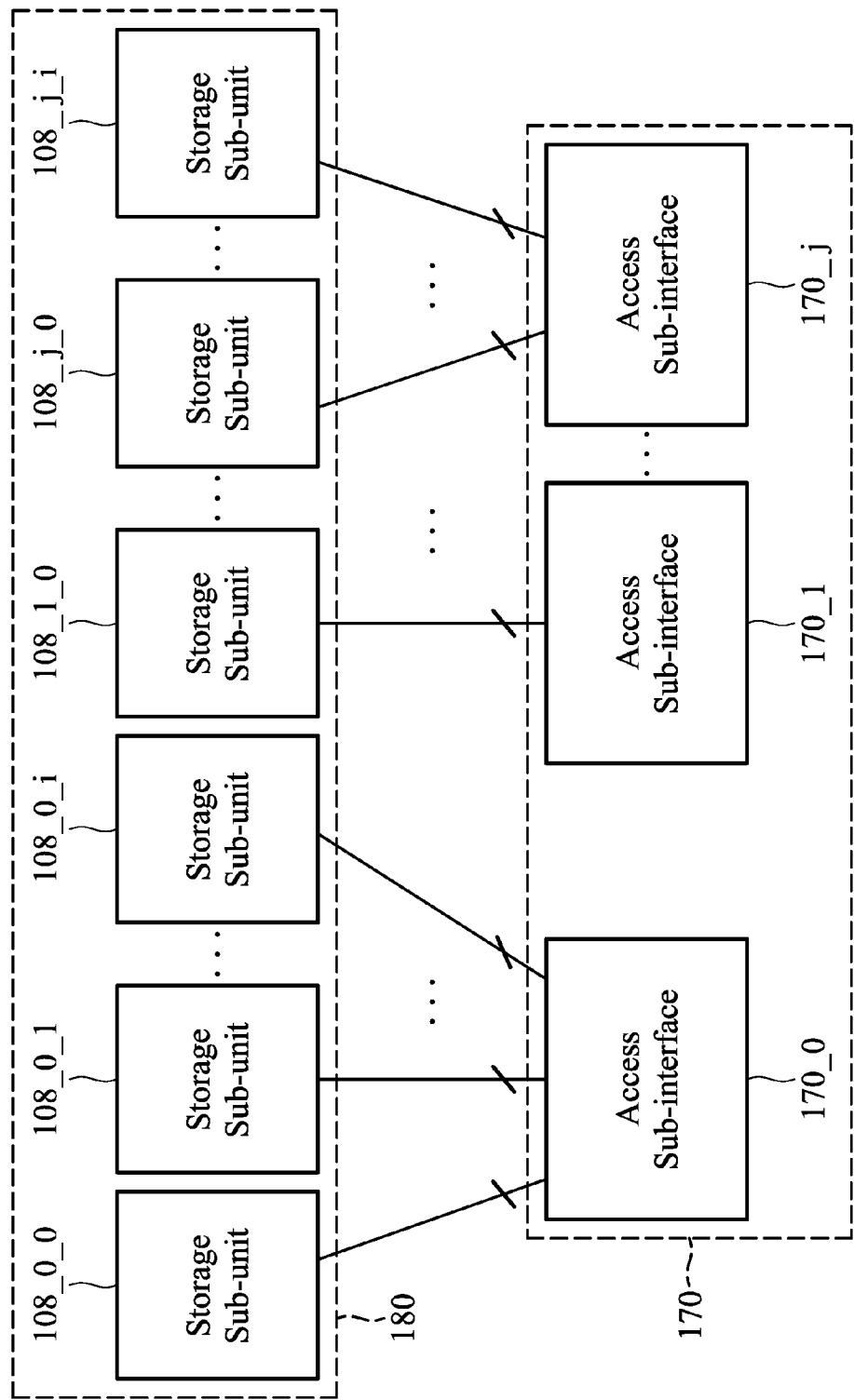
FIG. 3 is a schematic diagram illustrating interfaces to storage units of a flash storage according to an embodiment of the invention.
Figure 4:
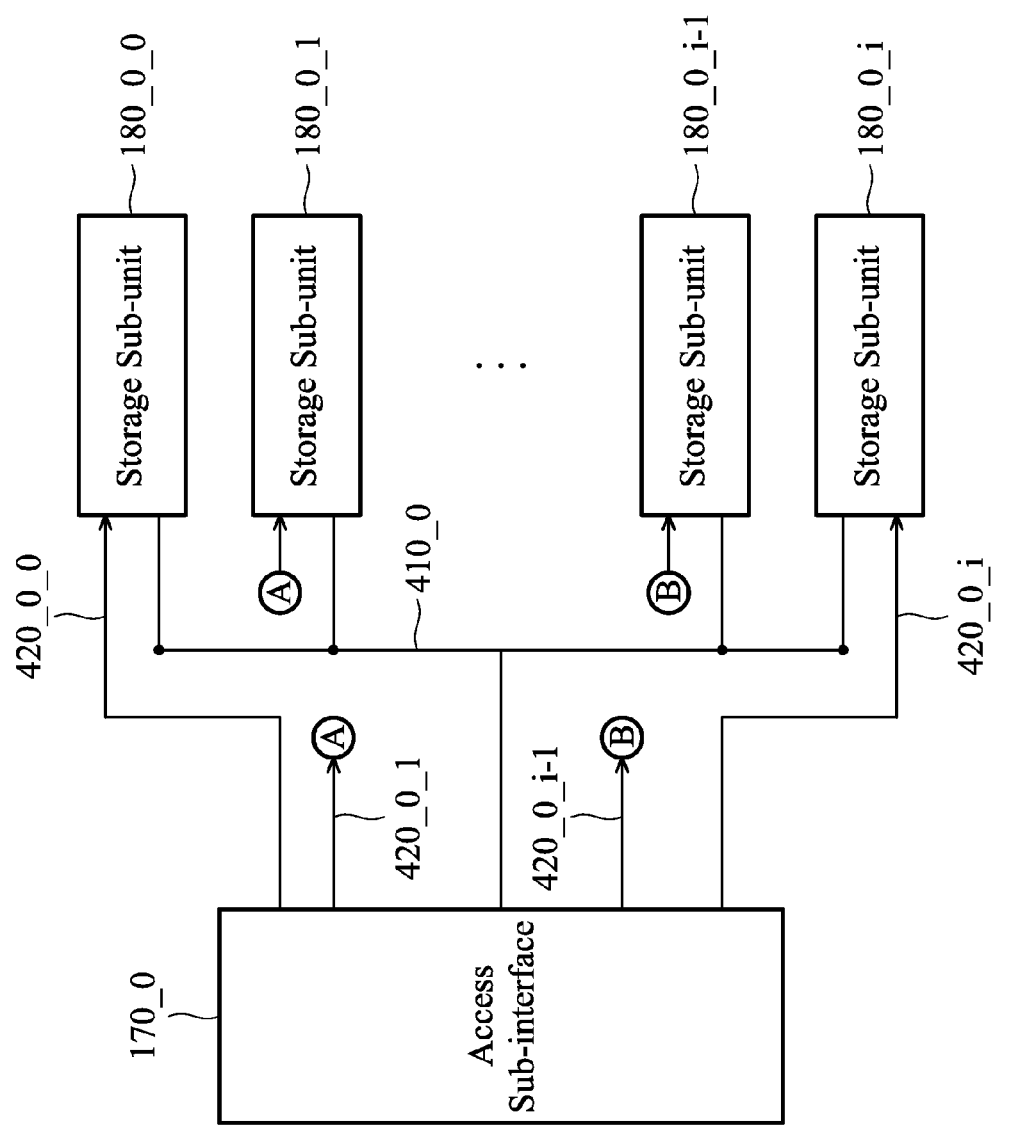
FIG. 4 is a schematic diagram depicting connections between one access sub-interface and multiple storage sub-units according to an embodiment of the invention.

The storage unit 180 may contain multiple storage sub-units and each storage sub-unit may be practiced in a single die and use an access sub-interface to communicate with the processing unit 110. FIG. 3 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The control unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 4 is a schematic diagram depicting connections between one access sub-interface and multiple storage sub-units according to an embodiment of the invention. The processing unit 110, through the access sub-interface 170_0, may use independent CE control signals 420_0_0 to 420_0_i to select one of the connected storage sub-units 180_0_0 to 180_0_i, and then read data from the designated location of the selected storage sub-unit via the shared data line 410_0.

A master device 160 may provide an LBA (Logical Block Address) to the processing unit 110 through the access interface 150 to indicate a particular region for data to be read from or written into. However, in order to optimize the data write efficiency, the access interface 170 distributes data with continuous LBAs across different physical regions of different storage sub-units. Thus, a mapping table, also referred to as an H2F (Host-to-Flash) table, is stored to indicate which location of a storage sub-unit data of each LBA is physically stored in. In one implementation, a DRAM may allocate enough space to store the mapping table. However, it consumes some resource of the DRAM and needs a sufficient lead time to store the whole mapping table in the DRAM. In another implementation, the H2F table may be divided into a given number of mapping segments, for example, 32 mapping segments, and distributed to store in storage sub-units 180_0_0 to 180_j_i. Each mapping segment stores information regarding which locations of storage sub-units data of an LBA range is physically stored, where the information is represented by block numbers and page numbers. The system architecture 10 of the flash memory further contains a mapping table buffer 130 storing a high-level mapping table, and the high-level mapping table contains multiple records each storing information regarding which location of a storage sub-unit a mapping segment is physically stored, where the information is represented by a block number and a page number. The mapping table buffer 130 is non-volatile storage space, in which the stored high-level mapping table will not be lost after powering down. Each time a read command with a read LBA are received from the master device 160, the processing unit 110 obtains a physical storage location of a mapping segment associated with the read LBA from the high-level mapping table of the mapping table buffer 130 and stores a command for reading data from the physical storage location in a FIFO (First-In-First-Out) queue 140, thereby enabling the access interface 170 to read the mapping segment required by the processing unit 110 from the designated physical storage location of the designated storage sub-unit according to the command of the FIFO queue 140 and move the read mapping segment to a data buffer 120. Subsequently, the processing unit 110 obtains a physical storage location associated with the read LBA from the mapping segment and stores a command for reading data from the physical storage location in the FIFO queue 140, thereby enabling the access interface 170 to read the data requested by the master device 160 from the designated physical storage location of the designated storage sub-unit according to the command of the FIFO queue 140 and move the read data to the data buffer 120. Those skilled in the art will appreciate that a FIFO queue is mapped to one storage sub-unit, which stores commands associated with the storage sub-unit. After the data requested by the master device 160 is moved to the data buffer 120 successfully, the processing unit 110 directs the access interface 150 to serially clock the data of the data buffer 120 out to the master device 160. It should be understood that the read command and the read LBA issued by the master device 160 may be referred to as a logical read command and a logical read address, respectively, and the read command and the physical storage location being stored in the FIFO queue 140 may be referred to as a physical read command and a physical read address, respectively. In addition, after a physical read command is executed, the physical read command is moved out from the FIFO queue 140.

Figure 5:
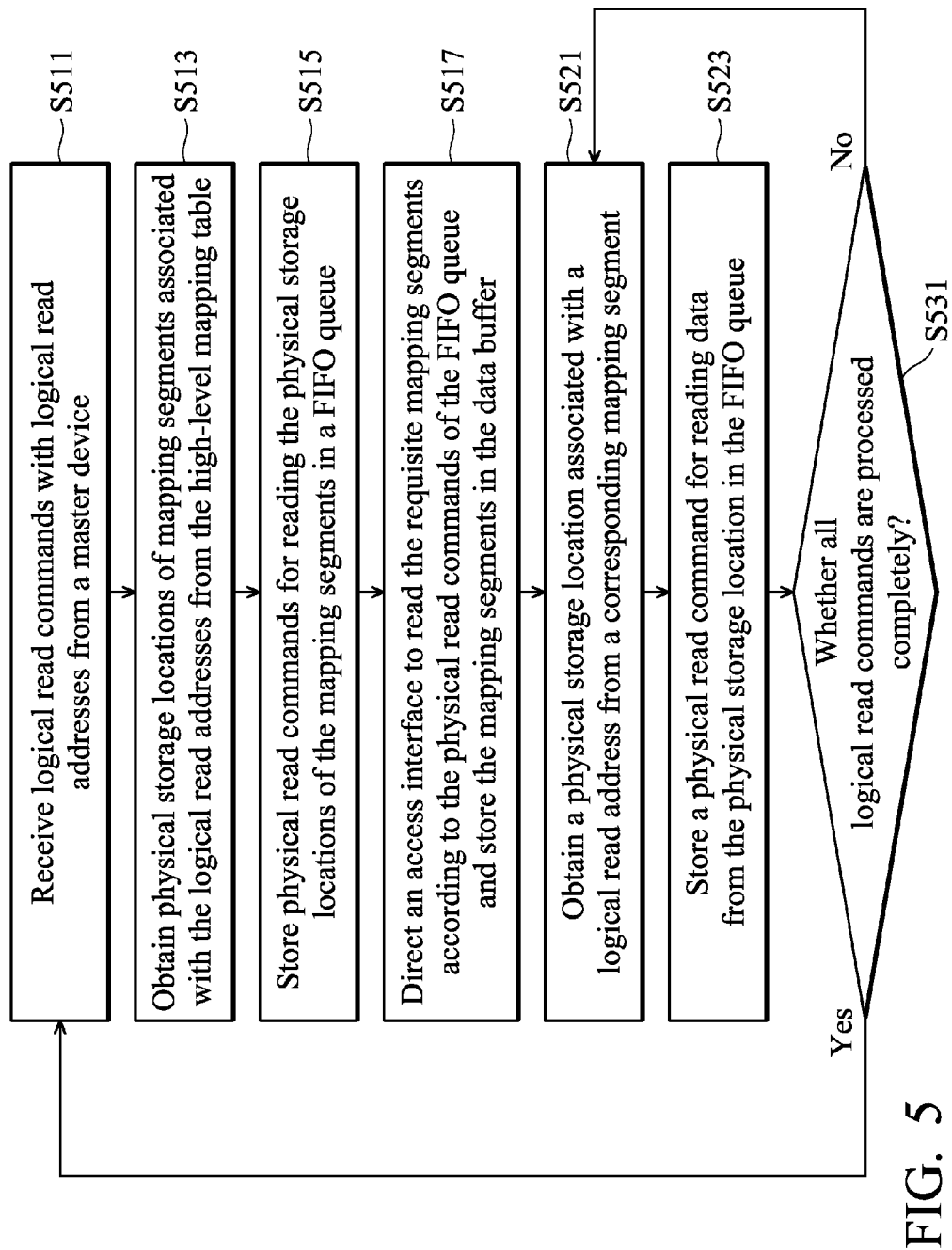
FIG. 5 is a flowchart illustrating a method for scheduling logical read commands, performed by a processing unit, according to an embodiment of the invention.
Figure 6:
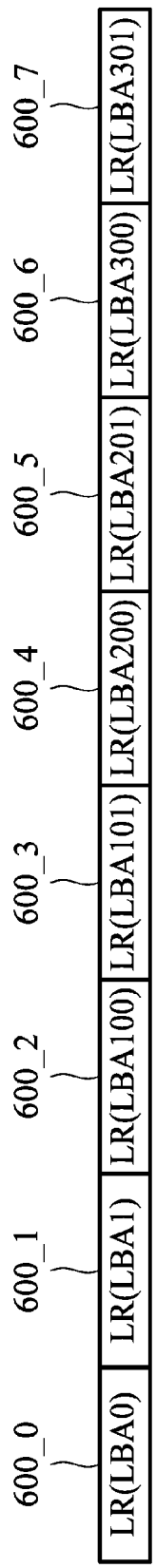
FIG. 6 is a schematic diagram of logical read commands according to an embodiment of the invention.
Figure 7:
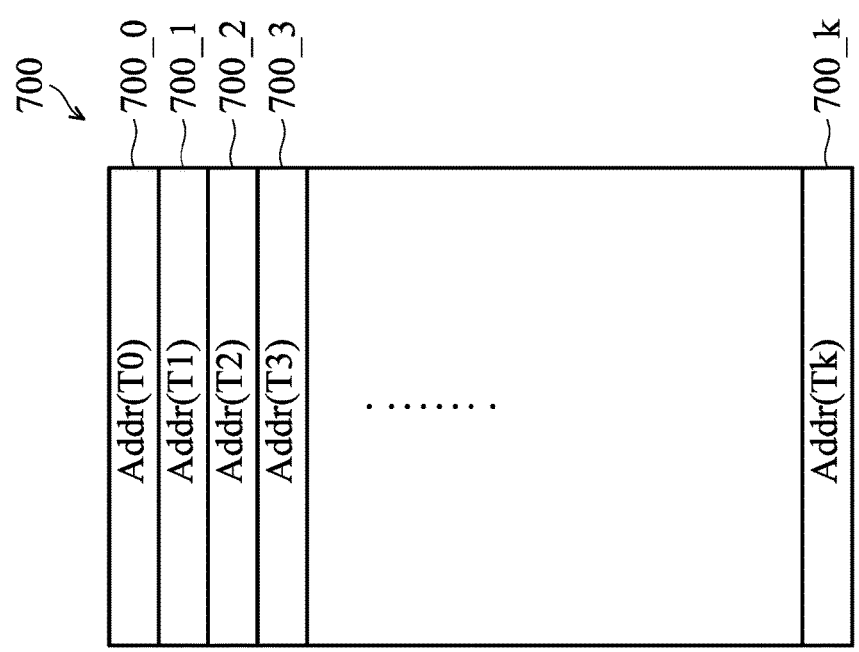
FIG. 7 is a schematic diagram of a high-level mapping table according to an embodiment of the invention.
Figure 8A:
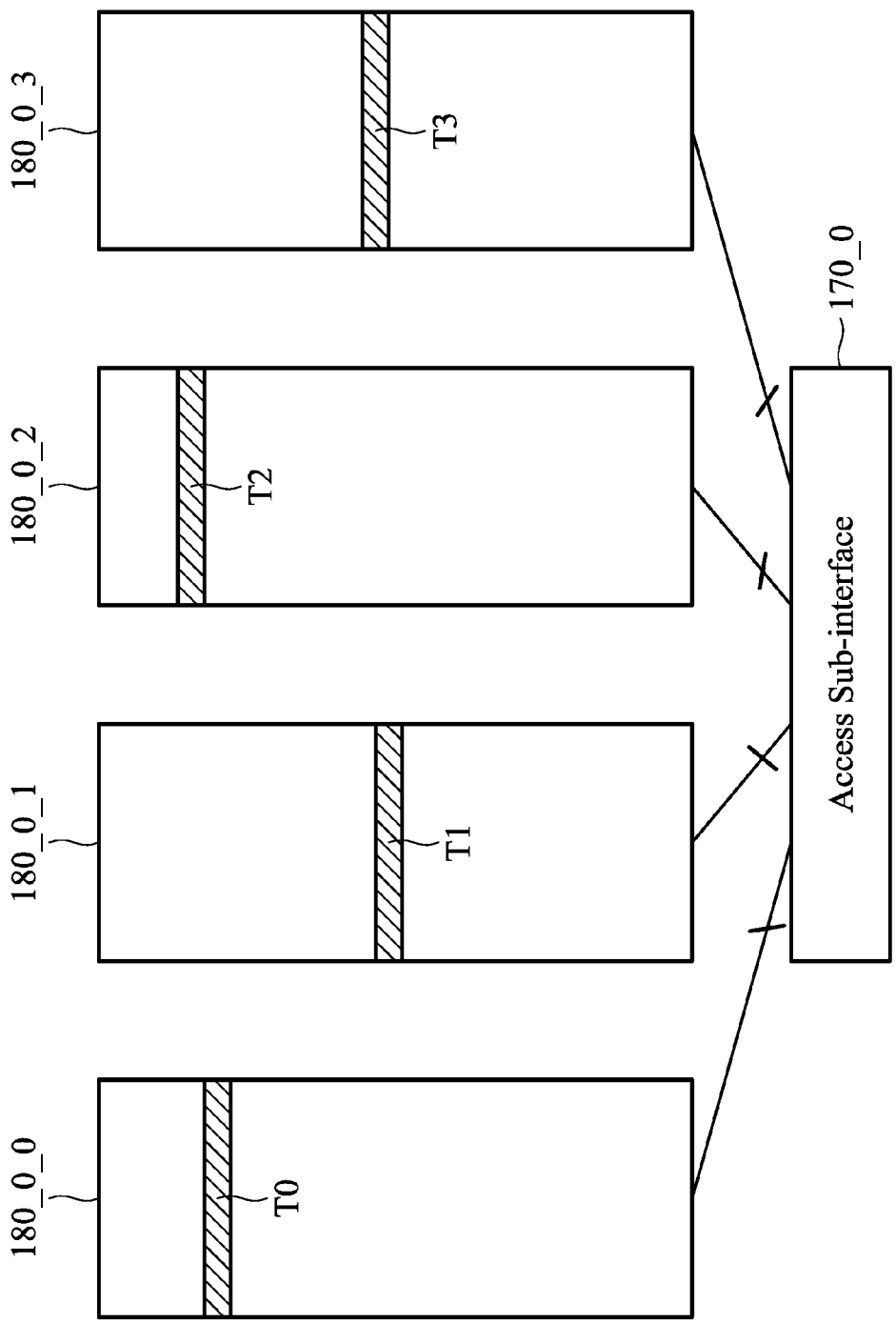
FIG. 8A is a schematic diagram illustrating the physical storage of mapping segments according to an embodiment of the invention.
Figure 9A:
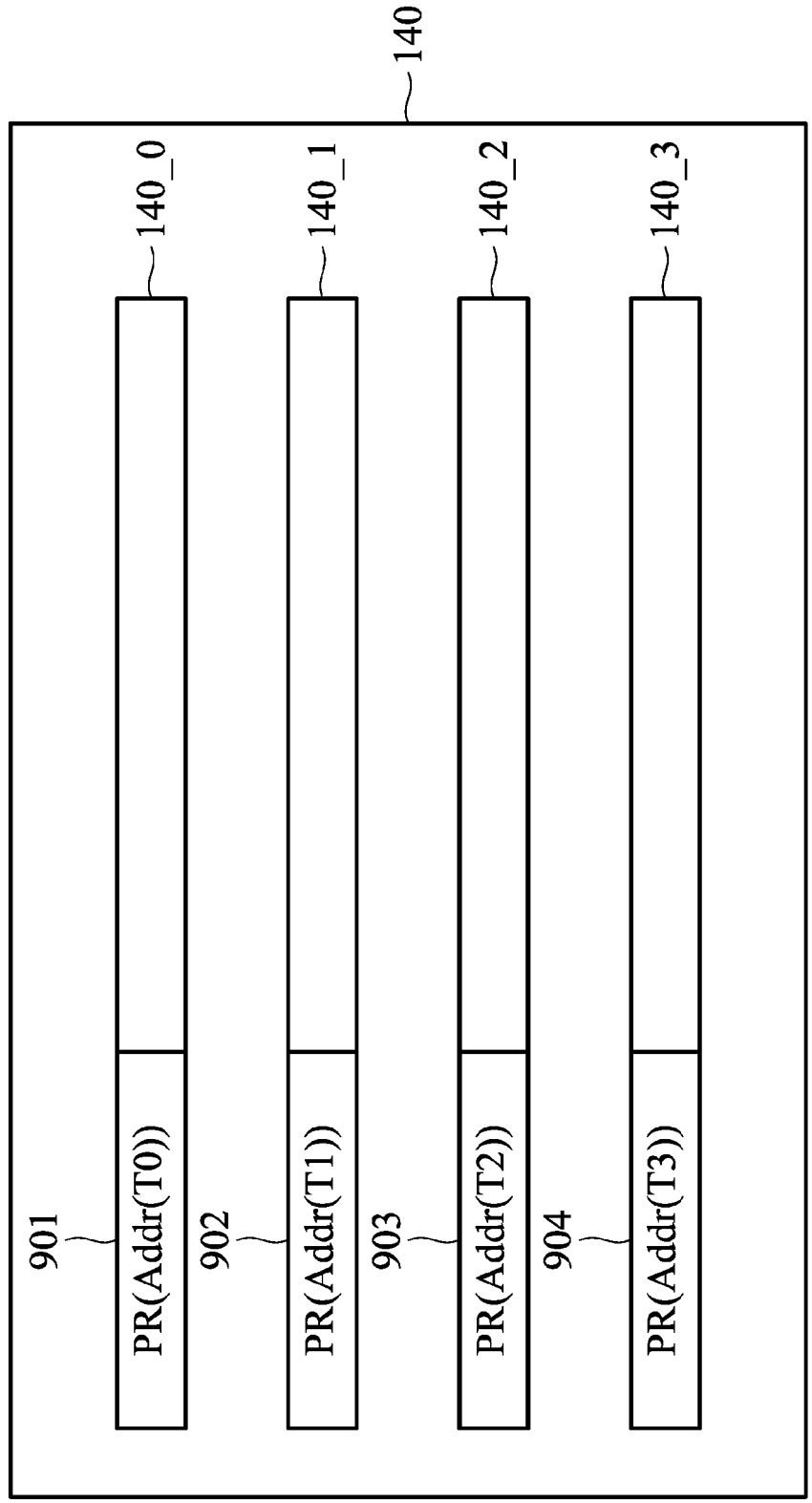
FIGS. 9A and 9B are schematic diagrams of FIFO queues according to an embodiment of the invention.

In order to realize the system architecture 10 of the flash memory as shown in FIG. 1, a method is needed to schedule multiple logical read commands. FIG. 5 is a flowchart illustrating a method for scheduling logical read commands, performed by the processing unit 110, according to an embodiment of the invention. After receiving multiple logical read commands with logical read addresses from the master device 160 via the access interface 150 (step S511), the processing unit 110 obtains physical storage locations of mapping segments associated with the logical read addresses from the high-level mapping table of the mapping table buffer 130 (step S513). FIG. 6 is a schematic diagram of logical read commands according to an embodiment of the invention. In an example, the processing unit 110 receives eight logical read commands (LR) 600_0 to 600_7 from the master device 160 via the access interface 150, which request to read data of LBA0, LBA1, LBA100, LBA101, LBA200, LBA201, LBA300 and LBA301, respectively. FIG. 7 is a schematic diagram of a high-level mapping table according to an embodiment of the invention. The high-level mapping table 700 may contain k records 700_0 to 700_k and each record stores information regarding a physical storage address of a mapping segment Addr(T1), where 1 is an integer ranging from 0 to k, which is represented by a block number and a page number. For example, the record 700_0 records the physical storage location information Addr(T0) of the $0^{th}$ mapping segment T0; the record 700_1 records the physical storage location information Addr(T1) of the $1^{st}$ mapping segment T1, and the rest can be deduced by analogy. Each mapping segment stores information regarding physical storage locations of a continuous LBA range. For example, the mapping segment T0 records information regarding the physical storage locations of LBA0~99; the mapping segment T1 records information regarding the physical storage locations of LBA100~199, and the rest can be deduced by the analogy. FIG. 8A is a schematic diagram illustrating the physical storage of mapping segments according to an embodiment of the invention. In an example, the access sub-interface 170_0 connects to four storage sub-units 180_0_0 to 180_0_3. In step S513, for example, the processing unit 110 may employ a mathematical equation n=m/100, where m represents an LBA and n represents a mapping segment number, to know that mapping segments associated with logical read addresses LBA0~1, LBA100~101, LBA200~201 and LBA300~301 are T0, T1, T2 and T3, respectively. Next, the processing unit 110 obtains physical storage locations Addr(T0) to Addr(T3) of the mapping segments T0 to T3 associated with the logical read locations 600_0 to 600_7 from the high-level mapping table of the mapping table buffer 130. Exemplary physical storage locations of mapping segments T0- to T3 may be referred to in FIG. 8A. The processing unit 110 subsequently stores physical read commands for reading the physical storage locations of the mapping segments in the FIFO queue 140 (step S515). FIG. 9A is a schematic diagram of FIFO queues according to an embodiment of the invention. The exemplary FIFO queue 140 contains four sub-queues 140_0 to 140_3 associated with storage sub-units 180_0_0 to 180_0_3 and storing physical read commands (PR) for reading mapping segments T0 to T3 901 to 904, respectively. Next, the processing unit 110 directs the access interface 170 to read the requisite mapping segments according to the physical read commands of the FIFO queue 140 and stores the mapping segments in the data buffer 120 (step S517). Referring to examples of FIG. 9A, specifically, the processing unit 110 directs the access sub-interface 170_0 to read the mapping segment T0 from the physical storage location Addr(T0) of the storage sub-unit 180_0_0 according to the physical read command 901 of the sub-queue 140_0, the mapping segment T1 from the physical storage location Addr(T1) of the storage sub-unit 180_0_1 according to the physical read command 902 of the sub-queue 140_1, the mapping segment T2 from the physical storage location Addr(T2) of the storage sub-unit 180_0_2 according to the physical read command 903 of the sub-queue 140_2, and the mapping segment T3 from the physical storage location Addr(T3) of the storage sub-unit 180_0_3 according to the physical read command 904 of the sub-queue 140_3, and stores the mapping segments T0 to T3 in the data buffer 120.

Figure 8B:
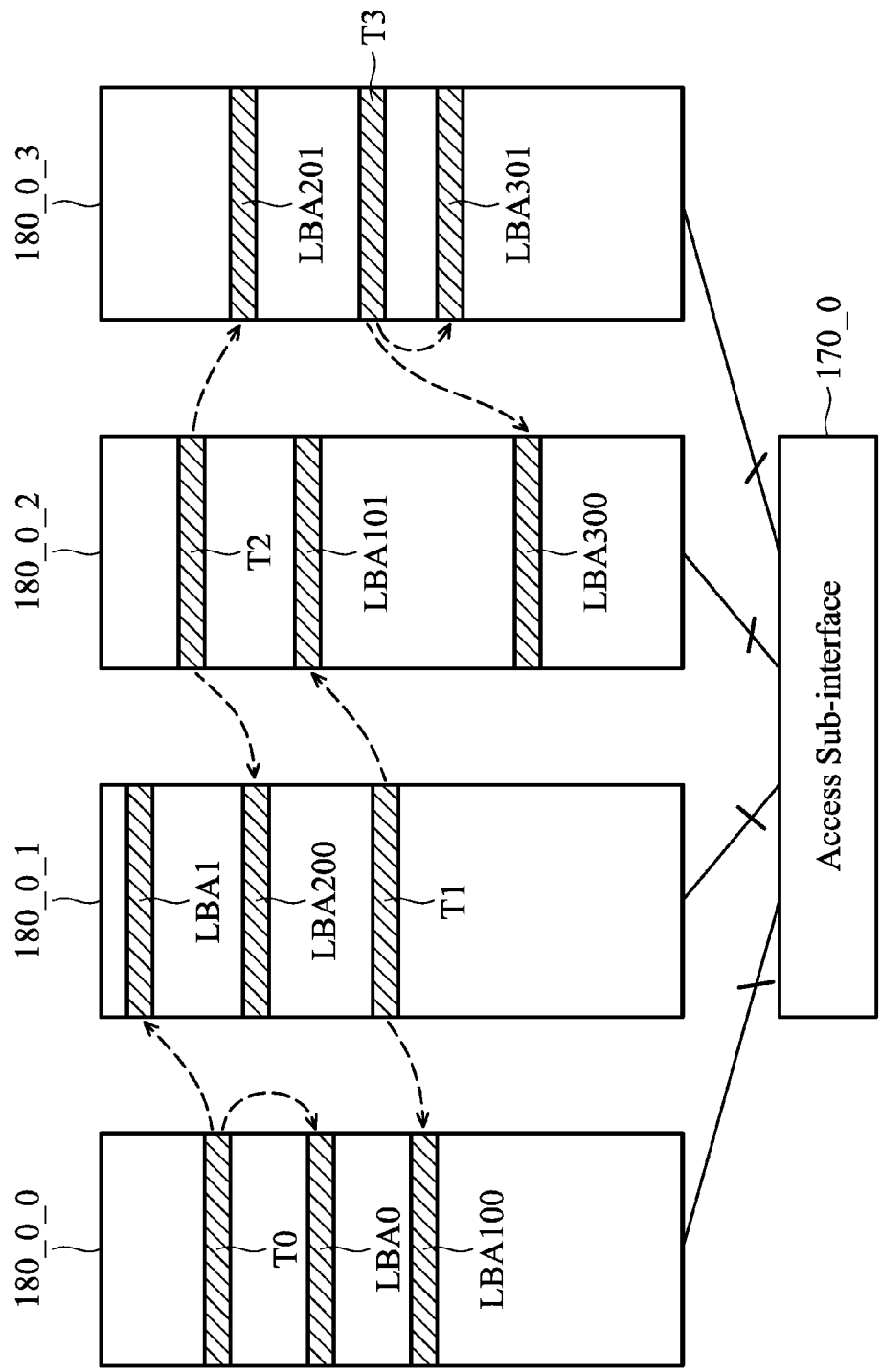
FIG. 8B is a schematic diagram illustrating the physical storage of mapping segments and the requested data according to an embodiment of the invention.
Figure 9B:
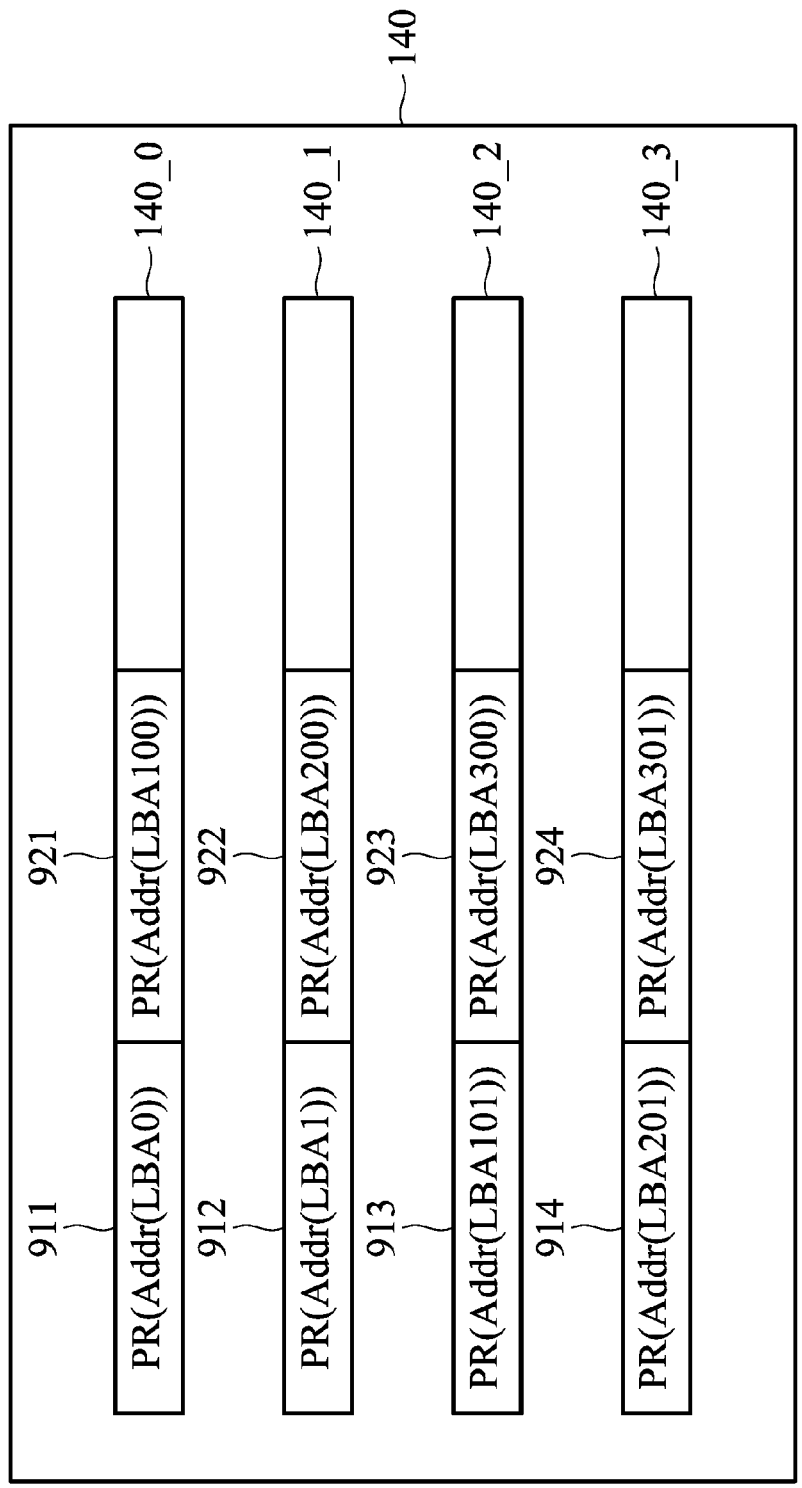

After preparing all requisite mapping segments, the processing unit 110 repeatedly performs a loop to obtain physical read locations from the mapping segments according to logical read commands with logical read addresses requested by the master device 160, and storing the physical read commands for reading data from the physical read locations in the FIFO queue 140 until all logical read commands are processed completely. In each run, specifically, the processing unit 110 obtains a physical storage location associated with a logical read address from a corresponding mapping segment of the data buffer 120 (step S521) and stores a physical read command for reading data from the physical storage location in the FIFO queue 140 (step S523). Next, it is determined whether all logical read commands are processed completely (step S531). If so, the process goes back to step S511 to continue the next run for dealing with a batch of logical read commands; otherwise, the process goes back to step S521 to continue the task for dealing with the next logical read command. FIG. 8B is a schematic diagram illustrating the physical storage of mapping segments and the requested data according to an embodiment of the invention. In the execution of step S521, the processing unit 110 knows that data of LBA0 and LBA1 is respectively stored in the storage sub-units 180_0_0 and 180_0_1 by referring to the mapping segment T0; data of LBA100 and LBA101 is respectively stored in the storage sub-units 180_0_0 and 180_0_2 by referring to the mapping segment T1; data of LBA200 and LBA201 is respectively stored in the storage sub-units 180_0_1 and 180_0_3 by referring to the mapping segment T2; and data of LBA300 and LBA301 is respectively stored in the storage sub-units 180_0_1 and 180_0_3 by referring to the mapping segment T3. FIG. 9B is a schematic diagram of FIFO queues according to an embodiment of the invention. In the execution of step S523, the processing unit 110 stores physical read commands 911 and 912 for reading data of LBA0 and LBA1 in the sub-queues 140_0 and 140_1, respectively; physical read commands 921 and 913 for reading data of LBA100 and LBA101 in the sub-queues 140_0 and 140_2, respectively; physical read commands 922 and 914 for reading data of LBA200 and LBA201 in the sub-queues 140_1 and 140_3, respectively; and physical read commands 923 and 924 for reading data of LBA300 and LBA301 in the sub-queues 140_2 and 140_3, respectively. It should be noted that, after completely storing the physical read commands, the processing unit 110 may direct the access sub-interface 170_0 to read data requested by the master device 160 from a physical storage location Addr(LBAx) of an associated storage sub-unit according to a physical read command of one of the sub-queues 140_0 to 140_3, store the read data in the data buffer 120, and direct the access interface 150 to clock the buffered data out to the master device 160. In one example, each time a physical read command is stored in an associated sub-queue, the processing unit 110 may direct the access sub-interface 170_0 and the access interface 150 to complete the above operations. In another example, each time every sub-queue is detected to store at least one physical read command, the processing unit 110 may direct the access sub-interface 170_0 to read data from the storage sub-units 180_0_0 to 180_0_3 in series, for example, reading data from the physical storage locations Addr(LBA0), Addr(LBA1), Addr(LBA101) and Addr(LBA201). Subsequently, the processing unit 110 directs the access interface 150 to read data from the data buffer 120 and clock the read data out to the master device 160 according to the order of the logical read commands.

Although the embodiment has been described as having specific elements in FIGS. 1 to 4, it should be noted that additional elements may be included to achieve better performance without departing from the spirit of the invention. While the process flow described in FIG. 5 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for scheduling read commands, performed by a processing unit, comprising:
   receiving a logical read command from a master device via a first access interface, wherein the logical read command requests to read data of a logical address;
   obtaining one of plurality of first physical storage locations of mapping segments that is associated with the logical address from a high-level mapping table, wherein a mapping table is divided into the mapping segments, the mapping segments are distributed to store in a plurality of storage sub-units and the storage sub-units provide non-volatile storage space;
   directing a second access interface to read one designated mapping segment from the obtained first physical storage location of a designated storage sub-unit;
   obtaining a second physical storage location associated with the logical address from the read mapping segment;
   directing the second access interface to read data from the second physical storage location of the designated storage sub-unit; and
   directing the first access interface to clock the data read from the obtained second physical storage location out to the master device.

2. The method of claim 1, wherein a storage unit comprises the storage sub-units and each storage sub-unit is associated with a sub-queue.

3. The method of claim 2, wherein, in the step of directing a second access interface to read one designated mapping segment from the obtained first physical storage location of the designated storage sub-unit further comprises:
   storing a physical read command for reading data from the obtained first physical storage location in one designated sub-queue;
   directing the second access interface to read the designated mapping segment from the obtained first physical storage location of the designated storage sub-unit according to the physical read command of the designated sub-queue; and
   storing the designated mapping segment in a data buffer.

4. The method of claim 2, wherein, in the step of directing the second access interface to read data from the second physical storage location of the designated storage sub-unit further comprises:
   storing a physical read command for reading data from the second physical storage location in one designated sub-queue;
   directing the second access interface to read data from the second physical storage location of the designated storage sub-unit according to the physical read command of the designated sub-queue; and
   storing the data in a data buffer.

5. The method of claim 2, wherein each storage sub-unit is enabled by an independent CE (Chip Enable) control signal, and the storage sub-units share a data line.

6. The method of claim 1, wherein the high-level mapping table comprises a plurality of records and each record stores information regarding which location one mapping segment of the mapping table is physically stored in the designated storage sub-unit and each mapping segment is associated with a logical address range.

7. The method of claim 1, wherein the logical address is represented by an LBA (Logical Block Address).

8. The method of claim 1, wherein the obtained first physical storage location or the second physical storage location is represented by a block number and a page number.

9. The method of claim 1, wherein the high-level mapping table is stored in a mapping table buffer and the mapping table buffer is non-volatile storage space.

10. The method of claim 1, wherein each storage sub-unit is implemented in a single die.

11. An apparatus for scheduling read commands, comprising:
    a mapping table buffer, storing a high-level mapping table;
    a first access interface, coupled to a master device;

a second access interface, coupled to storage unit; and
a processing unit, coupled to the mapping table buffer, the first access interface and the second access interface, receiving a logical read command from the master device via the first access interface, wherein the logical read command requests to read data of a logical address;
obtaining one of plurality of first physical storage locations of mapping segments that is associated with the logical address from the high-level mapping table, wherein a mapping table is divided into the mapping segments, the mapping segments are distributed to store in a plurality of storage sub-units and the storage sub-units provide non-volatile storage space;
directing the second access interface to read one designated mapping segment from the obtained first physical storage location of a designated storage sub-unit;
obtaining a second physical storage location associated with the logical address from the read mapping segment; directing the second access interface to read data from the obtained second physical storage location of the designated storage sub-unit; and directing the first access interface to clock the data read from the obtained second physical storage location out to the master device.

12. The apparatus of claim 11, wherein a storage unit comprises the storage sub-units and each storage sub-unit is associated with a sub-queue.

13. The apparatus of claim 12, wherein the processing unit further stores a physical read command for reading data from the obtained first physical storage location in one designated sub-queue; directs the designated second access interface to read the mapping segment from the obtained first physical storage location of the designated storage sub-unit according to the physical read command of the designated sub-queue; and stores the designated mapping segment in a data buffer.

14. The apparatus of claim 12, wherein the processing unit further stores a physical read command for reading data from the second physical storage location in one designated sub-queue; directs the second access interface to read data from the second physical storage location of the designated storage sub-unit according to the physical read command of the designated sub-queue; and stores the data in a data buffer.

15. The apparatus of claim 12, wherein each storage sub-unit is enabled by an independent CE (Chip Enable) control signal, and the storage sub-units share a data line.

16. The apparatus of claim 11, wherein each storage sub-unit is enabled by an independent CE (Chip Enable) control signal, and the storage sub-units share a data line.

17. The apparatus of claim 11, wherein the high-level mapping table comprises a plurality of records and each record stores information regarding which location one mapping segment of the mapping table is physically stored in the designated storage sub-unit and each mapping segment is associated with a logical address range.

18. The apparatus of claim 11, wherein the logical address is represented by an LBA (Logical Block Address).

19. The apparatus of claim 11, wherein the mapping table buffer is non-volatile storage space.

20. The apparatus of claim 11, wherein each storage sub-unit is implemented in a single die.

* * * * *